United States Patent Office 3,041,388
Patented June 26, 1962

3,041,388
METHOD FOR THE PREPARATION OF PLATES SUITABLE FOR USE IN ALKALINE BATTERIES
Masataro Fukuda, Kadomacho, Kitakawachi-gun, Osaka, Sennosuke Oda, Fujisawa-shi, and Yuiki Katashima, Chigasaki-shi, Japan, assignors to Matsushita Electric Industrial Co., Ltd., Osaka, Japan
No Drawing. Filed Aug. 18, 1959, Ser. No. 834,391
Claims priority, application Japan Aug. 20, 1958
9 Claims. (Cl. 136—24)

This invention relates to the preparation of plates suitable for use in alkaline batteries.

Heretofore plates used in alkaline batteries are prepared by dipping a porous nickel plate matrix into a molten bath of a certain salt of active element or an aqueous solution containing the same, and then putting an electric current in circulation through the treated plate and the other plate in an aqueous KOH solution, until the oxide or hydroxide of the active element is formed in the said porous metal plate matrix. In such conventional process as above, however, it is disadvantageously required that the last step, that is, the assemblage of a cell consisting of the plate matrix and the other plate and the aqueous KOH solution, and the current circulation through this cell, should be repeated many times.

An object of the present invention is therefore to make such trouble operation more easy going. Other objects will be apparent from the description and claims which follow.

In accordance with the present invention, a porous metal plate as matrix is dipped into an aqueous solution of nickel or cadmium salt, the matrix is subjected to drying preferably at 80° C. and then to heating at about 180 to 400° C. and preferably at 250° to 300° C. in an atmosphere of air or steam, whereby the abovesaid salt is converted into its oxide or hydroxide. Then the resulting plate is assembled together with the other plate in a 20% aqueous solution to form a cell through which thereafter an electric current-circulation is effected until the oxide or hydroxide is activated.

A porous metal plate matrix used as starting material preferably has the following characteristics:

Porosity _____ 80–85%.
Nickel powder purity ____ 99.9%.
Apparent specific viscosity _____ 0.9–1.0.
Diameter of pores _____ 1–10μ, preferably 3–7μ.
Specific gravity _____ 8.9 × 20/100–8.9 × 15/100.

With a view to reducing cost, copper- or iron-alloyed nickel plate matrix, that is such nickel plate matrix that a small portion of nickel is substituted with copper or iron, may be used in some cases.

As to suitable salts of active elements to be impregnated into the specified metal plate matrix, inorganic acid salts and lower aliphatic mono- or poly-carboxylic acid salts of nickel or cadmium and ammonium complex salts are employed, said carboxylic acid containing one to six carbon atoms. Typical salts which may be successfully used include inorganic acid salts such as nitrates, chlorides and sulfates; lower aliphatic monocarboxylic acid salts such as formates, acetates and monochloracetates; lower aliphatic polycarboxylic salt e.g. oxalates, citrates, and ammonium complex salts. In order for carrying out the impregnation of an aqueous solution of such salt effectively for a shorter period, the solution should be at a rather high concentration. Sometimes a saturated concentration is preferred. Time required for impregnation may be within the range of from 5 to 40 minutes. Such impregnation should be continued until 50% by volume of pores present are filled up with the solution in which the porous metal plate matrix is dipped.

The thus impregnated plate matrix is then subjected to drying at a temperature of 50° to 80° C., and preferably at a temperature of 60° to 80° C., for 15 to 90 minutes.

Thereafter, heating of the dried plate matrix is carried out in the atmosphere of air or steam. An atmosphere of air or steam is employed in the preparation of anode or positive plates, and in the preparation of cathode, or negative plates. Heating temperature may be within the range of from 180° to 400° C., preferably from 250° to 300° C. In the atmosphere of steam, time for heating may be 20 to 120 minutes in either case of the preparation of anode or cathode plates, i.e. positive or negative plates. In the atmosphere of air, while heating for the preparation of cathode or negative plates may be carried out for 30 to 90 minutes, that for the preparation of anode or positive plates should be done within the possible shortest period, e.g. from 2 to 5 minutes, since it is necessary to control the conversion of nickel salt being readily convertible to nickel oxide to such degree that the relatively larger amount of undecomposed nickel salt remains. By such heating operations, the considerable proportion of an active element salt impregnated is converted into its oxide or hydroxide form.

Then the thus treated metal plate is dipped together with another plate of opposite electrical polarity into a 20% aqueous KOH solution so as to constitute a cell, through which thereafter an electric current is circulated in the usual manner of electrolyzing, whereby the oxide or hydroxide is highly activated.

The metal plate thus produced is suitable for use in an alkaline battery and has the same performance and efficiency as compared with any plate which has been known heretofore.

The following examples, which are intended as informative and typical only and not in a limiting sense, will illustrate the invention.

*The Preparation of Anodes (Positive Plates)*

| Example No. | Type of Nickel Salt | Impregnation | | Concentration of Nickel Salt Solution | Drying | | Heating | |
|---|---|---|---|---|---|---|---|---|
| | | Temp. (° C.) | Time (min.) | | Temp. (° C.) | Time (min.) | Temp. (° C.) | Time (min.) |
| 1 | Nickel nitrate | 15–80 | 5–15 | 80–150 gr./100 gr. of water | 80 | 20–60 | 250 | 2–5 |
| 2 | Nickel chloride | 15–80 | 5–15 | 50–80 gr./100 gr. of water | 80 | 20–60 | 300 | 2–5 |
| 3 | Nickel acetate | 50–60 | 10–20 | Saturated | 60 | 10–30 | 300 | 2–5 |
| 4 | Nickel monochloracetate | 40–55 | 10–20 | ___do___ | 60 | 10–30 | 300 | 2–5 |
| 5 | Nickel citrate | 50–75 | 20–30 | ___do___ | 80 | 20–60 | 300 | 2–5 |
| 6 | Nickel oxalate | 15–40 | 10–20 | ___do___ | 60 | 10–30 | 300 | 2–5 |
| 7 | Nickel ammonium oxalate | 15–40 | 5–15 | ___do___ | 60 | 20–30 | 250 | 2–5 |

NOTE.—In each of examples, heating was carried out in the atmosphere of air.

*The Preparation of Cathodes (Negative Plates)*

| Example No. | Type of Cadmium Salt | Impregnation Temp. (° C.) | Impregnation Time (min.) | Concentration of Cadmium Salt. Soln. | Drying Temp. (° C.) | Drying Time (min.) | Heating Temp. (° C.) | Heating Time (min.) |
|---|---|---|---|---|---|---|---|---|
| 8 | Cadmium nitrate | 15–80 | 5–15 | 15–300 g./100 gr. of water | 80 | 30–60 | 400 | 30–60 |
| 9 | Cadmium chloride | 15–80 | 5–15 | ___do___ | 80 | 30–90 | 400 | 45–90 |
| 10 | Cadmium acetate | 40–60 | 10–20 | Saturated | 80 | 10–30 | 380 | 30–45 |
| 11 | Cadmium formate | 70–80 | 10–20 | 70 gr./100 gr. of water | 80 | 20–40 | 300 | 30–45 |
| 12 | Cadmium monochloracetate | 30–50 | 10–20 | Saturated | 60 | 10–30 | 320 | 30–45 |
| 13 | Cadmium oxalate | 30–55 | 10–20 | ___do___ | 60 | 10–30 | 300 | 30–60 |

NOTE.—Heating was carried out in the atmosphere of air. In the preparation of cathodes it is not necessary to avoid the entire conversion of metallic salt into oxide, although such conversion should be avoided in the preparation of anodes.

*The Preparation of Anodes (Positive Plates)*

| Example No. | Type of Nickel Salt | Impregnation Temp. (° C.) | Impregnation Time (min.) | Concentration of Nickel Salt Soln. | Drying Temp. (° C.) | Drying Time (min.) | Heating Temp. (° C.) | Heating Time (min.) |
|---|---|---|---|---|---|---|---|---|
| 14 | Nickel nitrate | 15–80 | 5–15 | 80–150 gr./100 gr. of water | 80 | 20–40 | 220–245 | 20–120 |
| 15 | Nickel sulfate | 15–80 | 5–15 | 40–65 gr./100 gr. of water | 80 | 20–40 | 250–350 | 20–100 |
| 16 | Nickel chloride | 15–80 | 5–15 | 50–80 gr./100 gr. of water | 80 | 20–40 | 250–330 | 20–120 |
| 17 | Nickel acetate | 50–60 | 15–20 | Saturated | 60 | 20–40 | 200–250 | 20–60 |
| 18 | Nickel mono-chloracetate | 40–55 | 15–25 | ___do___ | 60 | 20–40 | 220–280 | 20–60 |
| 19 | Nickel citrate | 50–75 | 20–40 | ___do___ | 80 | 20–60 | 220–260 | 20–120 |
| 20 | Nickel oxalate | 15–40 | 20–40 | ___do___ | 60 | 20–60 | 200–260 | 20–120 |
| 21 | Nickel ammonium oxalate | 15–40 | 20–30 | ___do___ | 60 | 10–30 | 180–280 | 20–100 |

NOTE.—In each of examples, heating was carried out in the atmosphere of steam.

*The Preparation of Cathodes (Negative Plates)*

| Example No. | Type of Cadium Salt | Impregnation Temp. (° C.) | Impregnation Time (min.) | Concentration of Cadmium Salt Soln. | Drying Temp. (° C.) | Drying Time (min.) | Heating Temp. (° C.) | Heating Time (min.) |
|---|---|---|---|---|---|---|---|---|
| 22 | Cadmium nitrate | 15–80 | 5–20 | 150–300 gr./100 gr. of water | 80 | 30–60 | 250–300 | 20–120 |
| 23 | Cadmium sulfate | 15–80 | 5–20 | Saturated | 80 | 20–40 | 250–350 | 20–120 |
| 24 | Cadmium chloride | 15–80 | 5–20 | ___do___ | 80 | 20–60 | 250–400 | 20–120 |
| 25 | Cadmium acetate | 40–60 | 5–15 | ___do___ | 80 | 15–50 | 250–320 | 20–120 |
| 26 | Cadmium formate | 20–70 | 5–15 | 70 gr./100 gr. of water | 80 | 15–50 | 220–310 | 20–120 |
| 27 | Cadmium monochloracetate | 30–50 | 5–15 | Saturated | 60 | 15–40 | 230–300 | 20–120 |
| 28 | Cadmium oxalate | 40–60 | 5–15 | ___do___ | 60 | 15–50 | 200–320 | 20–120 |

NOTE.—In each of examples, heating was carried out in the atmosphere of steam.

What we claim is:

1. In a method for the preparation of plates suitable for use in alkaline batteries, the improvement comprising dipping a porous nickel plate matrix into an aqueous solution of a salt selected from the group consisting of nickel salt being present in said solution in a concentration corresponding to maximally 48 grams of nickel ion per 100 grams of water, and cadmium salt being present in said solution in a concentration corresponding maximally to 142.4 grams of cadmium ion per 100 grams of water, at a temperature of from about 15° to 80° C. for from about 5 to 40 minutes, drying the resulting impregnated plate matrix at about 60° to 80° C. for from about 10 to 90 minutes, and heating the dried plate matrix at a temperature of from about 180° to 400° C. for from 2 to 120 minutes in an atmosphere selected from the group consisting of air and steam, thereby converting the nickel salt on said dried plate matrix essentially to nickel hydroxide.

2. In a method for the preparation of positive plates suitable for use in alkaline batteries, the improvement comprising dipping a porous nickel plate matrix into an aqueous solution of nickel salt having a concentration corresponding to maximally 48 grams of nickel ion per 100 grams of water, at a temperature of from about 15° to 80° C. for from about 5 to 40 minutes, drying the resulting impregnated plate matrix at about 60° to 80° C. for about 10 to 60 minutes, and heating the dried plate matrix at a temperature of from about 180° to 400° C. for from 2 to 120 minutes in an atmosphere selected from the group consisting of air and steam, thereby converting the nickel salt on said dried plate matrix essentially to nickel hydroxide.

3. In a method for the preparation of positive plates suitable for use in alkaline batteries, the improvement comprising dipping a porous nickel plate matrix into an aqueous solution of nickel salt having a concentration corresponding to maximally 48 grams of nickel ion per 100 grams of water, at a temperature of from about 15° to 80° C. for from about 5 to 40 minutes, drying the resulting impregnated plate matrix at about 60° to 80° C. for about 10 to 60 minutes, and heating the dried plate matrix in air at a temperature of from about 250° to 300° C. for from about 2 to 5 minutes, thereby converting the nickel salt on said dried plate matrix essentially to nickel hydroxide.

4. In a method for the preparation of positive plates suitable for use in alkaline batteries, the improvement comprising dipping a porous nickel plate matrix into an aqueous solution of nickel salt having a concentration corresponding to maximally 48 grams of nickel ion per 100 grams of water, at a temperature of from about 15° to 80° C. for from about 5 to 40 minutes, drying the resulting impregnated plate matrix at about 60° to 80° C. for about 10 to 60 minutes, and heating the dried plate matrix at a temperature of from about 180° to 350° C. for from about 20 to 120 minutes in an atmosphere of steam, thereby converting the nickel salt on said dried plate matrix essentially to nickel hydroxide.

5. In a method for the preparation of negative plates suitable for use in alkaline batteries, the improvement comprising dipping a porous nickel plate matrix in an aqueous solution of cadmium salt having a concentration corresponding to maximally 142.4 grams of cadmium ion per 100 grams of water, at a temperature of from about 15° to 80° C. for from about 5 to 20 minutes, drying the resulting impregnated plate matrix at about 60° to 80° C. for about 10 to 90 minutes, and heating the dried matrix at a temperature of from about 180° to 400° C. for from 2 to 120 minutes in an atmosphere selected from the group consisting of air and steam, thereby converting the nickel salt on said dried plate matrix essentially to nickel hydroxide.

6. In a method for the preparation of negative plates suitable for use in alkaline batteries, the improvement comprising dipping a porous nickel plate matrix in an aqueous solution of cadmium salt having a concentration corresponding to maximally 142.4 grams of cadmium ion per 100 grams of water, at a temperature of from about 15° to 80° C. for from about 5 to 20 minutes, drying the resulting impregnated plate matrix at about 60° to 80° C. for about 10 to 90 minutes, and heating the dried matrix in air at a temperature of from about 250° to 300° C. for from about 2 to 5 minutes, thereby converting the nickel salt on said dried plate matrix essentially to nickel hydroxide.

7. In a method for the preparation of negative plates suitable for use in alkaline batteries, the improvement comprising dipping a porous nickel plate matrix in an aqueous solution of cadmium salt having a concentration corresponding to maximally 142.4 grams of cadmium ion per 100 grams of water, at a temperature of from about 15° to 80° C. for from about 5 to 20 minutes, drying the resulting impregnated plate matrix at about 60° to 80° C. for about 10 to 90 minutes, and heating the dried matrix at a temperature of from about 180° to 350° C. for from about 20 to 120 minutes in an atmosphere of steam, thereby converting the nickel salt on said dried plate matrix essentially to nickel hydroxide.

8. A method as claimed in claim 2, wherein the salt of nickel is one member selected from the group consisting of nickel nitrate, nickel chloride, nickel sulfate, nickel acetate, nickel monochloracetate, nickel citrate, nickel oxalate and nickel ammonium oxalate.

9. A method as claimed in claim 5, wherein the salt of cadmium is one member selected from the group consisting of cadmium nitrate, cadmium chloride, cadmium sulfate, cadmium formate, cadmium acetate, cadmium monochloracetate and cadmium oxalate.

References Cited in the file of this patent
UNITED STATES PATENTS 2,831,044    Bourgalt et al. _____ Apr. 15, 1958

FOREIGN PATENTS 526,352    Canada _____ June 12, 1956

OTHER REFERENCES

Fleischer: "Sintered Plates for Nickel-Cadmium Batteries," "J. of Electrochem. Soc.," vol. 94, No. 6, December 1948, pages 289–299.